United States Patent
Akamatsu et al.

(10) Patent No.: US 11,426,901 B2
(45) Date of Patent: Aug. 30, 2022

(54) MAGNETIC CLAMP DEVICE

(71) Applicant: KOSMEK LTD., Kobe (JP)

(72) Inventors: Hiroshi Akamatsu, Kobe (JP); Masakazu Yoshida, Kobe (JP); Shotaro Murata, Akashi (JP); Ikkyu Oda, Kobe (JP)

(73) Assignee: KOSMEK LTD.

( * ) Notice: Subject to any disclaimer, the term of this patent is extended or adjusted under 35 U.S.C. 154(b) by 146 days.

(21) Appl. No.: 16/976,489

(22) PCT Filed: Apr. 1, 2019

(86) PCT No.: PCT/JP2019/014405
§ 371 (c)(1),
(2) Date: Aug. 28, 2020

(87) PCT Pub. No.: WO2019/202957
PCT Pub. Date: Oct. 24, 2019

(65) Prior Publication Data
US 2021/0046673 A1   Feb. 18, 2021

(30) Foreign Application Priority Data

Apr. 18, 2018 (JP) .............................. JP2018-080082

(51) Int. Cl.
*B29C 33/20* (2006.01)
*B29C 45/64* (2006.01)
(Continued)

(52) U.S. Cl.
CPC .............. *B29C 33/20* (2013.01); *B29C 45/64* (2013.01); *B29C 45/76* (2013.01); *H01F 7/02* (2013.01)

(58) Field of Classification Search
CPC ......... B29C 33/20; B29C 45/64; B29C 45/76; H01F 7/02
(Continued)

(56) References Cited

U.S. PATENT DOCUMENTS 6,636,153 B1   10/2003   Barton et al.

FOREIGN PATENT DOCUMENTS

JP   60-166525   11/1985
JP   2005-515080   6/2005
(Continued)

OTHER PUBLICATIONS

International Search Report dated Jun. 18, 2019 issued in International Application No. PCT/JP2019/014405 (2 pages).
(Continued)

*Primary Examiner* — Jeffrey M Wollschlager
*Assistant Examiner* — Xue H Liu
(74) *Attorney, Agent, or Firm* — Merek, Blackmon & Voorhees, LLC

(57) ABSTRACT

Provided is a magnetic clamp device that is capable of more finely measuring an induced voltage generated in a coil and selecting countermeasures against reductions in magnetization force. Multiple magnet blocks 11, 21 each comprising an invertible magnet 18, the polarity of which can be inverted, and non-invertible magnet 15, are positioned on a surface of a plate PL composed of magnetic body magnetically clamping a mold M1, M2 when in a magnetized state. The magnetic flux traversing the invertible magnet 18; and a control device 33 that determines whether or not there has been a polarity inversion in the induced voltage detected from the coil 31, and if there has been a polarity inversion, warns that the adhesion of the molds M1, M2 has decreased.

5 Claims, 4 Drawing Sheets

(51) Int. Cl.
*B29C 45/76* (2006.01)
*H01F 7/02* (2006.01)
(58) Field of Classification Search
USPC .......................................... 425/542
See application file for complete search history.

(56) References Cited

FOREIGN PATENT DOCUMENTS

| | | |
|---|---|---|
| JP | 2006224261 | 8/2006 |
| JP | 5385544 | 10/2009 |
| JP | 2009248352 | 10/2009 |
| JP | 5683826 | 10/2011 |
| JP | 2011206860 | 10/2011 |
| WO | 03/009972 | 2/2003 |

OTHER PUBLICATIONS

Extended European Search Report and Opinion dated Oct. 5, 2021 issued in connection with EP 19788595 (6 pages).

MAGNETIC CLAMP DEVICE

FIELD OF THE INVENTION

The present invention relates to a magnetic clamp device for detecting changes in magnetic attraction state while a mold is magnetically attracted to an injection molding machine.

A magnetic clamp device utilizing magnetic attraction force is known with respect to mold-fixing of an injection molding machine. The magnetic clamp device is a technique for magnetically fixing a mold by attracting a plate of a magnetic body to a platen. The plate has a polarity non-invertible magnet and an invertible magnet (alnico magnet), and can be switched between a magnetic circuit closed in the plate and a magnetic circuit passing through the mold by controlling the magnetic polarity of the alnico magnet with a coil.

To magnetically attract a mold to the plate, a magnetic clamp needs to sufficiently magnetize the mold. However, in practice, there are many elements for reducing magnetic flux between a magnetic clamp device and the mold. For example, there are cases where external force superior to magnetic attraction force acts on the mold due to overpacking in which a mold for molding use is too pressurized, erroneous use of an ejector rod, protrusion by a nozzle, and the like. According to this, the mold is dropped from the magnetic clamp device.

According to patent literature 1, a plurality of magnetic attraction units for fixing a mold and detection means for detecting an operation state of the magnetic clamp device are provided. An exploring coil of the detection means is attached outside a main coil of the magnetic attraction units. According to this, when the mold moves slightly relative to the magnetic clamp device, a voltage is induced in the exploring coil to detect abnormality of a magnetization state.

The induced voltage is a function of the product of the number of turns and a magnetic flux change rate, and a small magnetic flux change in a short time interval causes a large voltage. According to patent literature 2, a technique in which a coil for switching the polarity of an alnico magnet is effectively used as a detection coil for detecting displacement or floating of a mold is known. According to this, increasing the number of turns of the coil and detecting a change of weak magnetic flux generate high induced electromotive force in comparison with noise.

Patent literature 3 discloses a method for providing abnormality determination in case a voltage waveform induced in a coil continues for a predetermined time than a first threshold value or in case a voltage exceeding a second threshold value exceeding the first threshold value generates even a short period of time.

PRIOR ART

Patent Literature

Patent literature 1: Japanese Patent Laid Open Publication No. 2005-515080
Patent literature 2: Japanese Patent No. 5385544
Patent literature 3: Japanese Patent No. 5683826

DISCLOSURE OF THE INVENTION

Problems to be Solved by the Invention

In patent literatures 1, 2, and 3, when an induced voltage generated in the coil is measured and exceeds a threshold value set in a comparison circuit, an emergency situation is generated as displacement or floating occurs in the mold. The threshold value is set so as not to cause erroneous operation due to noise. In patent literature 3, a pulse variation and a variation in which the induced voltage continues for a predetermined time are determined to be abnormal by a second threshold value and by a first threshold value smaller than the second threshold value, respectively. The purpose of the present invention is to provide a magnetic clamp device capable of more finely measuring an induced voltage generated in a coil and selecting various countermeasures against reductions in magnetization force.

Means to Solve the Problem

In the magnetic clamp device of the present invention, a plurality of magnet blocks are arranged on a surface of a plate composed of a magnetic body magnetically clamping a mold in a magnetization state. Each magnet block has an invertible magnet capable of inverting the polarity by an external magnetic flux and a non-invertible magnet. The magnetic flux generated between the mold and the plate is detected by a coil. A control device determines whether or not there has been a polarity inversion in the induced voltage detected from the coil, and, if there has been a polarity inversion, warns that an attraction force of the mold has decreased.

Effects of Invention

According to the present invention, even if the magnetization force of each magnet block is decreased, if the mold is clamped to the magnet block at the initial position state, the mold can be closed and re-attached to resume work in a short time.

BRIEF DESCRIPTION OF THE DRAWINGS

FIG. 1A is a general view, and FIGS. 1B-D are explanatory views showing a procedure for attaching a mold to the injection molding machine.

FIG. 2A is a left magnet plate, and FIG. 2B is a right magnet plate.

FIG. 4A is a block or circuit diagram of a preferred magnetic clamp device, and FIG. 4B is a diagram showing a program flow of a preferred control device.

PREFERRED EMBODIMENT OF THE INVENTION

Examples (i.e., preferred forms) of the present invention will be described below.

Figure 1A:
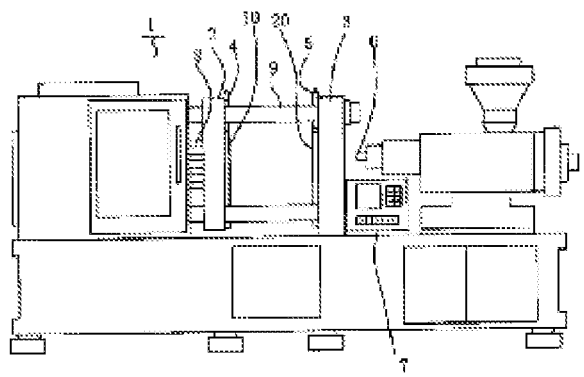
FIGS. 1A to 1D are diagrams showing an injection molding machine.

In FIG. 1A, an injection molding machine 1 includes left and right platens 2, 3 to which molds M1, M2 are respectively attached, and a guide rod 9 which supports and guides the left side platen 2 to freely move forward and backward in right and left directions. Magnetic clamp devices 10, 20 for magnetically attracting the mold are attached to platens 2, 3, respectively. Reference numeral 6 denotes a nozzle for injecting resin; 7, a controller with a liquid crystal display screen; and 8, an ejector rod for extruding an injection molded product from the mold M1. Further, reference numerals 4, 5 denote mold auxiliary fittings, respectively.

Figure 1B:
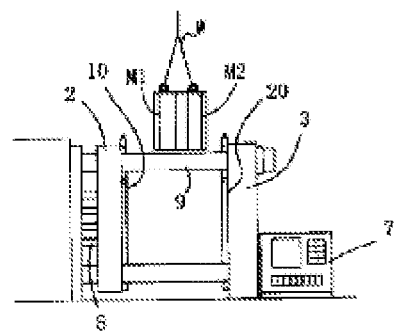
Figure 1C:
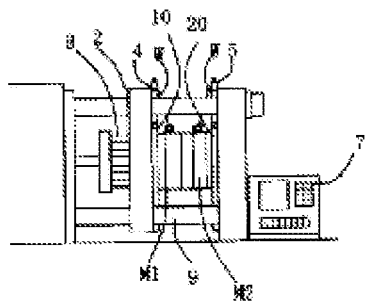
Figure 1D:
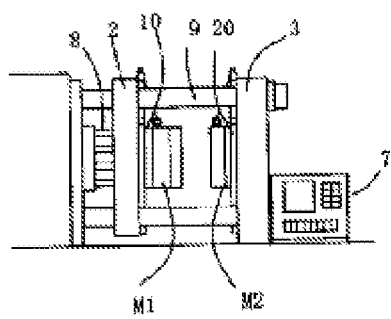

FIGS. 1B to 1D are views for explaining a procedure for magnetically attracting the right and left molds M1, M2 to respective magnetic clamp devices 10, 20. The left and right molds M1, M2, respectively, are suspended and conveyed between the magnetic clamp devices 10, 20 in a state in which the left and right molds M1, M2 are combined with each other (FIG. 1B). At this time, the magnetic clamp devices 10, 20 are in a state in which the molds M1, M2 are demagnetized (demagnetized state being a state without magnetic attraction). Next, the left side platen 2 is moved to the right to clamp the molds M1, M2 between the magnetic clamp devices 10, 20. In this state, the magnetic clamp devices 10, 20 are switched from the demagnetized state to a magnetized state of the molds M1, M2 (magnetization state being a state of magnetic attraction) (FIG. 1C). Then, a wire W hanging the molds M1, M2 is hooked to mold auxiliary fittings 4, 5 provided on the platens 2, 3, respectively (FIG. 1D). The mold auxiliary fittings 4, 5 are used to prevent the molds M1, M2 from falling down to the floor. In the state of FIG. 1D, the molds M1, M2 are clamped by magnetic force to the magnetic clamp devices 10, 20.

Figure 2A:
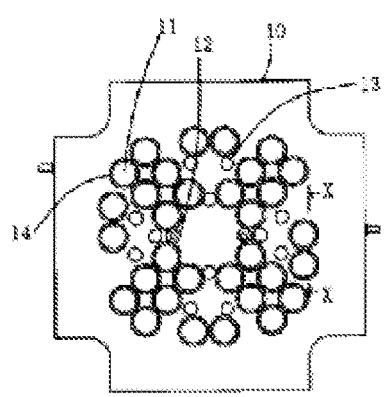
FIGS. 2A and 2B are views of a magnet plate seen from the surface.
Figure 2B:
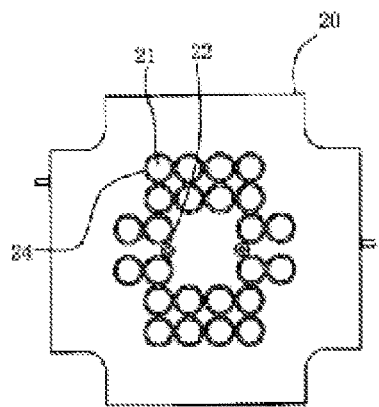

FIGS. 2A and 2B are views of the magnetic clamp devices 10, 20 viewed from the surface. FIG. 2A is a left side magnetic clamp device 10, and FIG. 2B is a right side magnetic clamp device 20. A number of magnet blocks 11, 21 are arranged on the surfaces of the magnetic clamp devices 10, 20, respectively. In addition, arranged are magnetic flux coils (not shown) for detecting changes in proximity sensors 12, 22 and magnetic flux. A through-hole 13 into which the ejector rod 8 is inserted is provided in the magnetic clamp device 10.

A main body of the magnetic clamp device 10 is a plate PL composed of magnetic body (made of steel), and a number of circular grooves 14, 24 are provided on the surface (the left side of the drawing). Portions surrounded by the grooves 14, 24 correspond to the magnet blocks 11, 21.

Figure 2C:
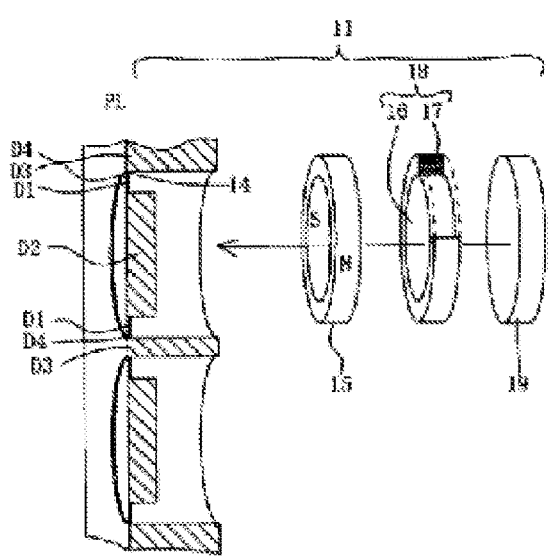
FIG. 2C is a cross-sectional view taken along line X-X in FIG. 2A.

The structures of the magnet blocks 11, 21 are the same, and therefore, the magnet block 11 will be described representatively. FIG. 2C is a cross-sectional view taken along line X-X line in FIG. 2A. In the figure, the plate PL is integrally provided with a part D1 in which the thickness of steel is reduced on the inner peripheral side of a groove 14, and a disc-shaped inner pole D2 in which the thickness of steel is increased inside the part D1. A ring-shaped non-invertible magnet 15 is fitted from the back side of the plate PL into the part D1 in which the thickness of the steel is reduced. The non-invertible magnet 15 has magnetic poles on an inner peripheral side and an outer peripheral side of a ring which forms an outer shape or portion thereof, for example, the inner peripheral side is S-pole and the outer peripheral side is N-pole. As the non-invertible magnet 15, for example, a neodymium magnet can be used. A disk-shaped alnico magnet 16 and an invertible magnet 18 consisting of a coil 17 wound around the outer periphery of the alnico magnet 16 are arranged on the rear side of the non-invertible magnet 15. A disc-shaped yoke 19 is fitted into the rear side of the invertible magnet 18. The inner peripheral side of the non-invertible magnet 15 is magnetically coupled to the inner pole D2, and magnetically coupled to an outer peripheral side (outer pole D3) of the part D1 having a thin outer peripheral side thickness. The alnico magnet 16 is magnetically coupled to the inner pole D2 and the yoke 19, and the yoke 19 is magnetically coupled to the outer pole D3. A portion D4 of the groove 14 is further thinner than the other parts, and is easily magnetically saturated. As seen in, for example, FIGS. 2C to 2E, since the left surface side of the plate PL is covered or a continuous steel layer surface of the plate PL, the non-invertible magnet 15 and the invertible magnet 18 can be sealed from a working area on which the mold M1 is attached.

Figure 2D:
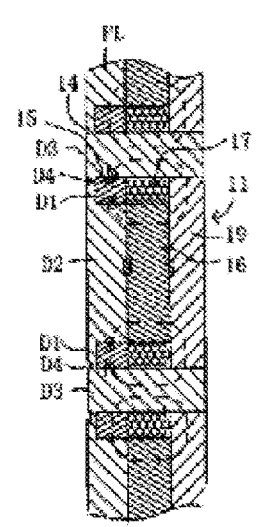
FIG. 2D shows a state when the magnetic clamp device is in a demagnetized state.

FIG. 2D shows a state when the magnetic clamp device 10 is in a demagnetized state. The alnico magnet 16 is formed in a permanent magnet in which the surface (the left side of the drawing) of the plate PL is N-pole and the back side is S-pole. Accordingly, the magnetic flux passes through a magnetic circuit composed of the non-invertible magnet 15, the outer pole D3, the yoke 19, the alnico magnet 16, and the inner pole D2. In this state, since the magnetic flux does not leak on the surface of the plate PL, the mold M1 is not attracted.

Figure 2E:
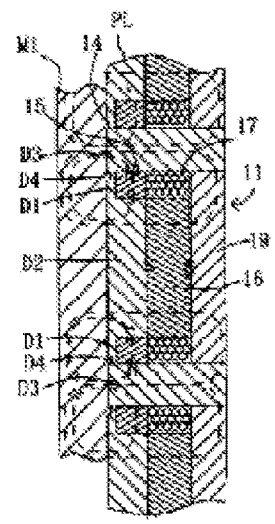
FIG. 2E shows a state when the magnetic clamp device is in a magnetized state.

FIG. 2E shows a state when the magnetic clamp device 10 is in a magnetized state. The magnetic pole of the alnico magnet 16 is inverted by supplying a direct current from outside to the coil 17. The alnico magnet 16 is formed in a permanent magnet in which the surface of the plate PL is S-pole and the back side is N-pole. The polarity of the alnico magnet 16 is inverted, and the direct current is allowed to flow only for a time for keeping the necessary magnetic flux. On the surface side of the plate PL, both the non-invertible magnet 15 and the invertible magnet 18 are coupled to the inner pole D2 as S-pole. When the mold M1 is pressed against the surface of the plate PL, these magnetic fluxes pass through the mold M1. Therefore, a magnetic circuit composed of the non-invertible magnet 15, the outer pole D3, the mold M1 and the inner pole D2, and a magnetic circuit composed of the alnico magnet 16, the outer pole D3, the mold M1 and the inner pole D2 are formed. Since coercive force of the alnico magnet 16 is not relatively high as a permanent magnet, when the mold M1 is lost, the magnetic force from the surface of the plate PL to outside is immediately lost by the magnetic force of the non-invertible magnet 15.

Figure 3A:
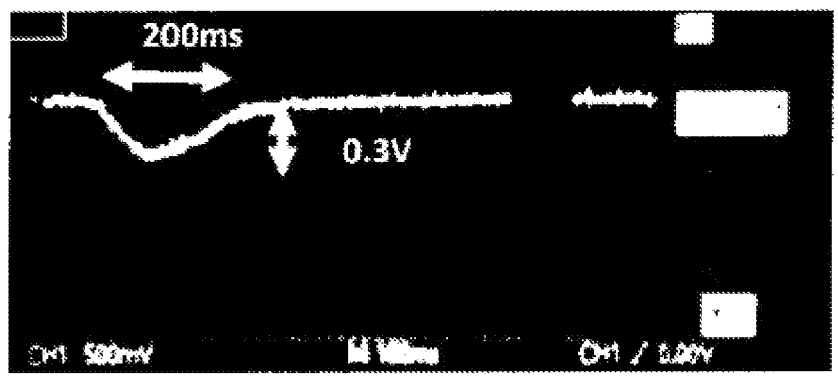
FIGS. 3A, 3B and 3C show a transient state of a voltage detected by a coil when a mold is moved slightly.
Figure 3A:
Figure 3B:
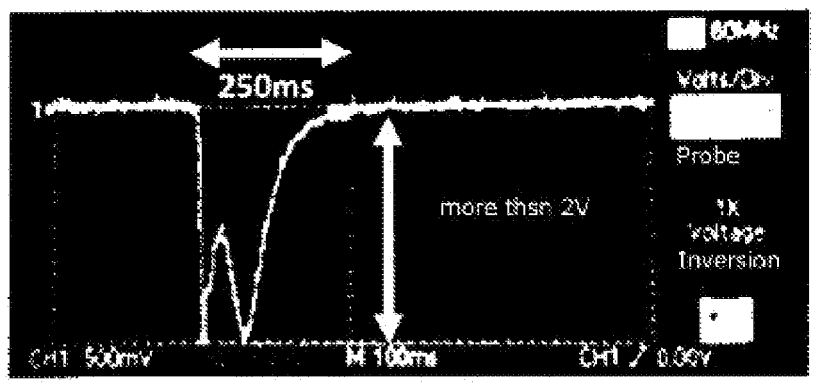
Figure 3B:
Figure 3C:
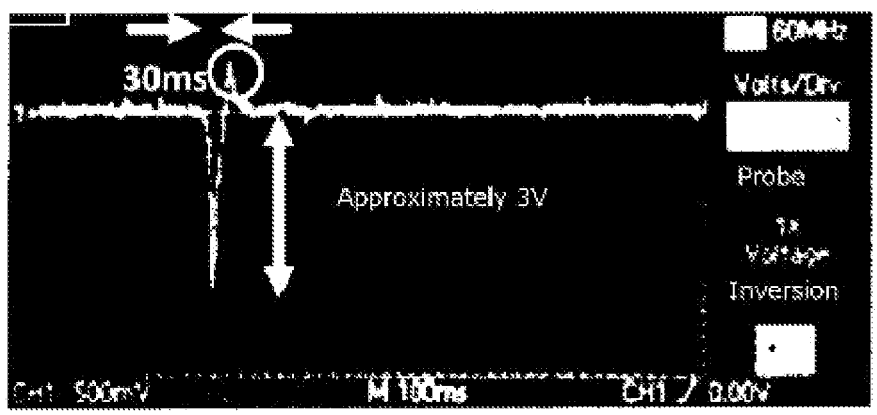
Figure 3C:

FIGS. 3A, 3B and 3C show a transient state of induced voltage that is detected when the mold M1 is slightly moved by applying several turns of coils (sensor coils) to the alnico magnet 16. In this example, the relationship between the plate PL and the mold M1 is as shown in FIG. 1D. By colliding the ejector rod 8 with the mold M1, a state in which the mold M1 moves was reproduced. When the proximity sensor 12 detected that the mold M1 had been separated from the plate PL by 0.2 mm or more, it was determined that the mold was detached from the plate PL. Each of FIGS. 3A, 3B shows a transient waveform of induced voltage when it was detected that the mold M1 had been detached. In FIG. 3A, the ejector rod 8 is slowly collided, and in FIG. 3B, the ejector rod 8 is collided at a high speed. The speed was adjusted to the speed set at the time of the collision. In both of FIGS. 3A, 3B, each protruding force of the ejector rod 8 is larger than the attraction force of the magnetic clamp device 10.

FIG. 3A shows a state in which the mold M1 moved during 200 msec after the collision. Further, FIG. 3B shows a state in which the mold M1 was rapidly moved by the collision of the ejector rod 8 and thereafter shifted further.

Then, the ejector rod 8 was made to collide in a state in which the protruding force of the ejector rod 8 was smaller than the attraction force of the magnetic clamp device 10. When the collision speed of the ejector rod 8 was increased to reach a fixed speed, mold separation was detected by the proximity sensor 12. On the other hand, a voltage waveform shown in FIG. 3C could be observed at a speed in which the mold separation was not detected.

According to the waveform of FIG. 3C, the mold M1 is moved during the collision of the ejector rod 8. At this time, the voltage waveform swings to a negative side, indicating that the magnetic flux passing through the coil is rapidly decreased. Thereafter, a phenomenon in which the voltage waveform exceeds 0 V and the polarity is changed to a positive side (circular mark part) is generated. This shows that the magnetic flux passing through the coil is increased. The mold M1 is pulled back and clamped to the plate PL again.

Output voltage e of the coil is obtained by the following equation, $$e = -N d\varphi/dt$$

The reference code N is the number of turns of the coil. The magnetic flux $\Delta\varphi$ lost due to behavior of the mold M1 can be evaluated by measuring voltage induced in the coil. The magnetic flux $\Delta\varphi$ can be calculated by integrating the output voltage e over time and dividing by the number of coil turns N.

It is momentary that the mold M1 is separated. However, at its separating instant, demagnetization occurs because a strong reverse magnetic flux by the non-invertible magnet 15 is given to the alnico magnet 16. The attraction force of the magnetic clamp device 10 is reduced from the initial state, and the mold M1 is slightly separated. Also, in FIG. 3C, although the lost magnetic flux $\Delta\varphi$ is small, it should be noted that the mold M1 may have moved from the initial position even if the mold M1 has been pulled back.

The lost magnetic flux $\Delta\varphi$ as described above is the output voltage e integrated over time divided by the number of coil turns. The negative side shows a lost magnetic flux and the positive side shows a recovered magnetic flux. In this embodiment, the magnetic flux $\Delta\varphi$ lost as a whole is calculated by summing up the sampling voltages in consideration of positive and negative relations as the output voltage e integrated over time, and then, by using a correspondence table for converting the total value into a cancellation magnetic flux. Here, the sampling voltages are obtained by sampling the voltage induced in the coil at a specific sampling frequency.

A warning concerning the reduction of the attraction force is issued on the basis of the calculated lost magnetic flux. Further, when it is determined that the attraction force has reduced several times and it has become difficult to maintain the specified attraction force, a warning may be issued to restart the magnetization. When the demagnetization is observed, a warning may be issued as the mold M1 is moved from the initial position regardless of the magnetic flux calculation result.

Figure 4A:
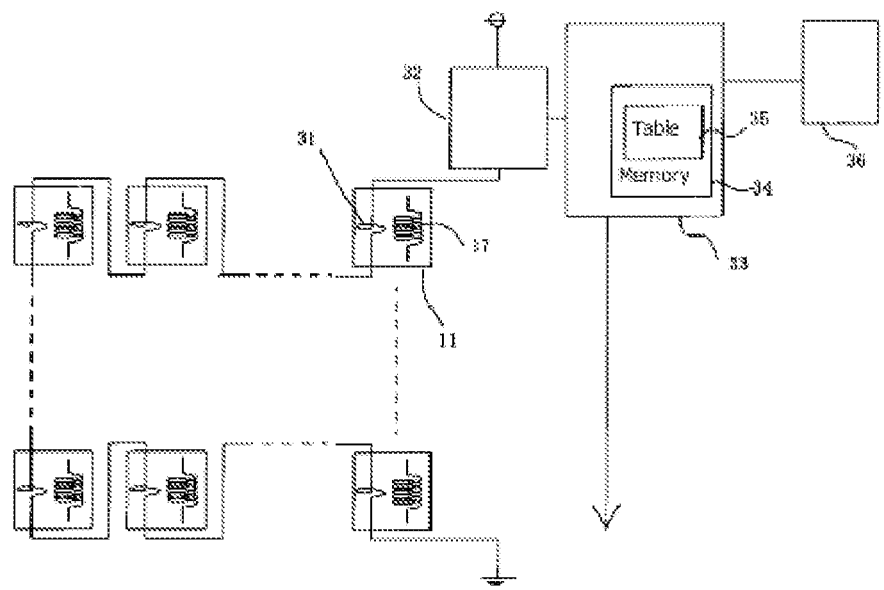
FIGS. 4A and 4B are diagrams showing a preferred embodiment.

A preferred embodiment will be described below with reference to FIGS. 4A and 4B. FIG. 4A is a circuit diagram showing a magnetic clamp device 10 representative of the two left and right magnetic clamp devices 10, 20. Since the magnetic clamp device 20 is the same as the magnetic clamp device 10, a description of the magnetic clamp device 20 is omitted.

A magnet block 11 has a coil 17 (magnetization coil) for magnetizing the alnico magnet 16, and a coil 31 (sensor coil) for detecting a change in magnetic flux. In the diagram, the coil 31 is provided for each magnet block 11, but the coil 31 may be selectively provided in a plurality of magnetic blocks 11. The coil 31 detects the magnetic flux passing through the alnico magnet 16, and in this embodiment, the coil 31 is wound on the alnico magnet 16 itself. The coils 31 of each magnet block 11 are connected in series, one end thereof is grounded, and the other end is connected to a voltage dividing circuit 32. The voltage dividing circuit 32 is a circuit for storing the induced voltage swinging positive and negative within a measurable voltage range of a control device. A control device 33 is a microprocessor for control, samples output voltages of the voltage dividing circuit 32 in a predetermined sampling period (about 1 msec), and stores them in an internal memory. A warning device 36 is, for example, an LED display device or a speaker. The warning device 36 may be any one that can recognize the type of warning. Further, the control device 33 may report a warning to a controller with an upper liquid crystal display device (for example, a controller 7 of FIG. 1A), and display the content of the warning on the liquid crystal screen on the controller side. Besides, a constant threshold value is set to positive/negative voltage in the control device 33 so that noise included in the output of the voltage dividing circuit 32 be is not detected.

Figure 4B:
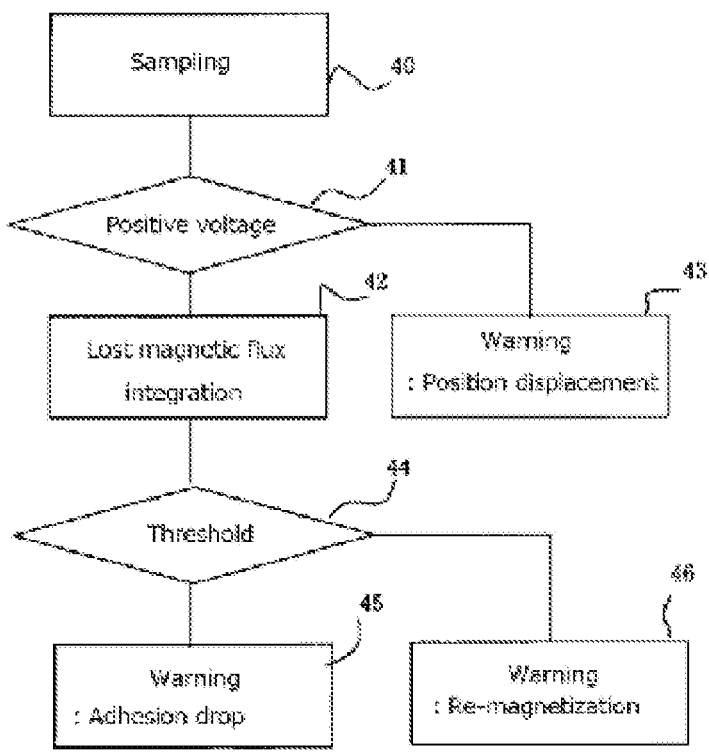

FIG. 4B shows a program flow of the control device 33. The control device 33 starts sampling by a change in the induced voltage (Step 40). As a result of sampling, it is determined whether or not there is a change in the induced voltage from negative to positive (Step 41). If there is no change in the induced voltage to positive within a predetermined sampling period (for example, 100 msec), a warning is issued to notify that the clamping state of the mold M1 has changed including the position (Step 43). In case positive and negative polarities are varied, lost magnetic flux is obtained from a table 35 stored in a memory 34 in the control device 33 in advance, and lost magnetic flux stored in the past is integrated into the obtained lost magnetic flux (Step 42). If the integrated value does not reach the predetermined threshold value (Step 44), it is warned that the attraction force has reduced while clamping (Step 45).

If the integrated value reaches the threshold value, a warning to re-magnetize is issued (Step 46). In this case, since it can be determined that the mold M1 has not moved from the initial position, as shown in FIG. 1C, re-magnetization is performed by returning to the state where the two molds M1, M2 are matched, and then, supplying the direct current to the coil 17.

According to this embodiment, even if the magnetic attraction force of the magnet block is decreased, if the molds M1, M2 are clamped to the magnetic clamp device 10 or 20 in the initial position state, closing the molds M1, M2, switching from the magnetized state to the demagnetized state, and then re-magnetizing (again switching to the magnetizing state) allows the work to be restored in a short time.

In the step 42 of the present embodiment, in case positive and negative polarities are varied, lost magnetic flux is obtained from a table 35 stored in a memory 34 in the control device 33 in advance, and if the integrated value does not reach the predetermined threshold value, it was determined that the mold M1 had not moved from the initial position. Alternatively, a warning may be issued immediately without being integrated. In the case of receiving this warning, re-magnetization may be performed after stopping the injection molding machine 1 or after demagnetizing to the magnetic clamp device 10 once.

In the present embodiment, due to the control device 33, the output voltage of the voltage dividing circuit 32 was sampled and stored in the internal memory at the predetermined sampling period. Alternatively, a predetermined threshold value may be set for each of positive and negative, and whether or not the level has been exceeded may be stored in the internal memory.

In the above embodiment, different coils are used for the coil 31 (sensor coil) and the coil 17 (magnetization coil). However, as shown in patent literature 2, a magnetic pole reversing coil may be used by switching as a sensor coil. When the magnetic pole reversing coil is used as a sensor coil, a circuit for switching is required, but there is an advantage that the sensitivity is improved. In the above embodiment, the sensor coil 31 wound around the alnico magnet 16 itself is used. However, the sensor coil 31 is not limited to the position where it is arranged in the present embodiment, and may be arranged at another location. For example, the sensor coil 31 may be arranged around the outer periphery of the inner pole D2. In this case, the sensor coil 31 may be arranged in a space which is provided between the part D1 and the non-invertible magnet 15.

In the above embodiment, the control device 33 receives the induced voltage from the coil 31 through the voltage dividing circuit 32, and issues an alarm to the warning device 36 by a program shown in FIG. 4B or reports a warning to an upper controller (for example, a controller 7 of FIG. 1A). Alternatively, in case the upper controller includes a memory and a microprocessor, the program shown in FIG. 4B may be set, and the induced voltage from the coil 31 may be detected by the upper controller to re-magnetize after stopping the injection molding machine 1 or after once demagnetizing to the magnetic clamp device 10. Further, it this time, the content of the warning may be displayed on the liquid crystal screen of the upper controller.

DESCRIPTION OF SYMBOLS

1 injection molding machine
2, 3 platen
4, 5 mold auxiliary fitting
8 ejector rod
9 guide rod
10, 20 magnetic clamp device
11, 21 magnet block
12, 22 proximity sensor
13 through-hole
14, 24 groove
15 non-invertible magnet
16 alnico magnet
17 coil (magnetizing coil)
18 invertible magnet
19 yoke
20 magnetic clamp device
31 coil (sensor coil)
32 voltage dividing circuit
33 control device
34 memory
35 table
36 warning device

The invention claimed is:

1. A magnetic clamp device having multiple magnet blocks arranged on a surface of a plate composed of a magnetic body magnetically clamping a mold when in a magnetic state, each of said magnet blocks comprising an invertible magnet capable of inverting a polarity and a non-invertible magnet, said magnetic clamp device comprising:
a coil for detecting a transient change in magnetic flux passing through the invertible magnet, and
a control device for determining whether or not a polarity of induced voltage detected from the coil by the change in the magnetic flux is inverted by a positive/negative voltage threshold, and for warning that an attraction force of the mold is decreased when the inversion of the polarity is detected.

2. The magnetic clamp device according to claim 1, wherein when the induced voltage detected from the coil is negative, the control device issues a warning indicating that a clamp state of the mold has changed including a position.

3. The magnetic clamp device according to claim 1, wherein when the polarity of the induced voltage detected from the coil is inverted, the control device calculates lost magnetic flux from the induced voltage, integrates with lost magnetic flux calculated when the polarity inversion has been detected last time, and issues a warning to urge the magnetic clamp device to be re-magnetized when the polarity has reached a predetermined threshold value.

4. An injection molding machine in which a pair of plates, each of which include a magnetic body, are attached to left and right platens, respectively, and a mold is clamped to each of said pair of plates, the injection molding machine comprising:
a plurality of magnet blocks being disposed on a surface of each of said pair of plates and configured to magnetically clamp a mold in a magnetized state, each of said pair of plates having an invertible magnet capable of inverting polarity and a non-invertible magnet,
a coil for detecting a change in magnetic flux passing through the invertible magnet, and
a control device for determining whether or not a polarity of induced voltage detected from the coil is inverted by the change of the magnetic flux, and for warning that an attraction force of the mold is decreased when the inversion of the polarity is detected,
wherein each mold clamped to the pair of plates is re-magnetized in a state of being matched with the corresponding plate upon receiving the warning from the control device.

5. An injection molding machine having first and second plates each of which include a magnetic body, said first plate and second plate are attached to left and right platens, respectively, and a first mold is clamped to said first plate and a second mold is clamped to said second plate, the injection molding machine comprising:
a plurality of magnet blocks disposed on a surface of each of said first plate and said second plate, each of said plurality of magnet blocks having an invertible magnet capable of inverting polarity and a non-invertible magnet, and configured to magnetically clamp a corresponding mold in a magnetized state,
a coil for detecting a change in magnetic flux passing through the invertible magnet, and
a controller for determining whether or not a polarity of induced voltage detected by the coil is inverted by the change in magnetic flux and for re-magnetizing each of the first and second molds clamped by the first and second plates, respectively in a state of being matched with each other upon detecting an inversion of polarity.

* * * * *